Patented Aug. 11, 1925.

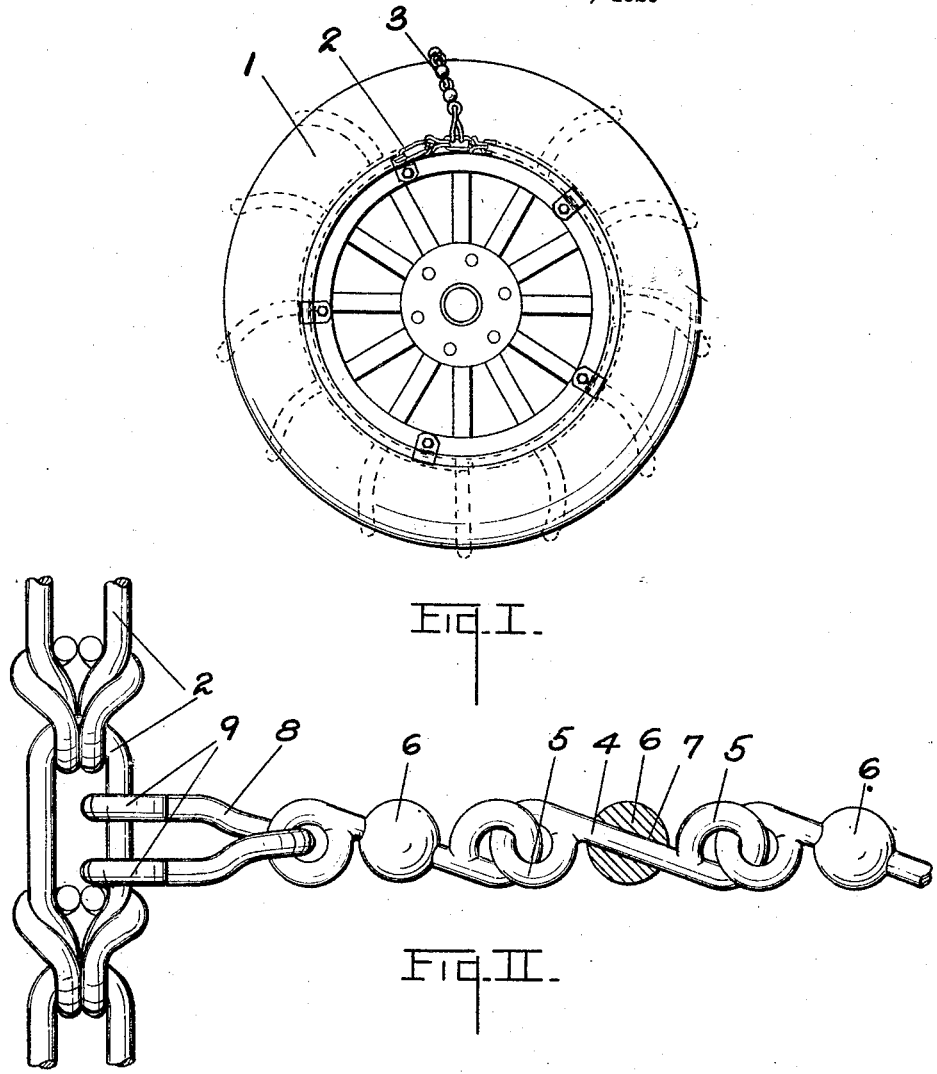

1,549,002

UNITED STATES PATENT OFFICE.

CHAUNCEY W. HODGES, OF GALESBURG, MICHIGAN.

TIRE CHAIN.

Application filed September 28, 1920, Serial No. 413,285. Renewed January 5, 1925.

*To all whom it may concern:*

Be it known that I, CHAUNCEY W. HODGES, a citizen of the United States, residing at Galesburg, county of Kalamazoo and State of Michigan, have invented certain new and useful Improvements in Tire Chains, of which the following is a specification.

This invention relates to improvements in tire chains.

The main objects of this invention are:

First, to provide an improved tire chain which is very effective as an anti-slip device.

Second, to provide an improved tire chain, having effective tread portions, which is not likely to wear the tire on which it is used, and which is very durable in use.

Objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side elevation of a motor vehicle wheel, having my improved tread chain applied thereto, various parts being shown in conventional form.

Fig. II is an enlarged detail view of the tread chain removed from the wheel, parts being broken away and one of the lug members being shown in section.

In the accompanying drawing similar reference characters refer to similar parts in both views.

Referring to the drawing, 1 represents a motor vehicle wheel having a pneumatic tire thereon, 2 one of the side chains and 3 one of the tread or cross chains. My improved tread or cross chain comprises a plurality of links having bar-like body portions 4 and oppositely disposed eyes or loops 5, the loops being preferably round as shown. On the body portions 4 between the loops are spherical lugs or wear members 6. These wear members are preferably formed of balls having bores 7 therethrough to receive the body portions of the links, the lugs being placed upon the links before one of the loops is formed. In practice the lugs are formed of balls as indicated. The lugs 6 may be welded to the links so that they will not be rotatable thereon.

I preferably provide end links 8 having hooks 9 which may be engaged with the side members. These wear members or lugs 6 are preferably of approximately the diameter of the loops at the ends of the links and case hardened and provide a series of knob-like projections for the cross chains, very effective as traction lugs, and also as wear members; that is, they receive the severest portion of the wear, relieving the loop portions of the links, so that the structure is not only effective as an anti-slip device, but is very durable in use, and it also has the further advantage of not unduly wearing the tire upon which it is used.

Having thus described my invention, what I claim as new and desire to secure by Letters Patent, is:

1. A tire chain cross member comprising a plurality of links having bar-like body portions with oppositely disposed round loops at their ends and spherical lugs fixed on said body portions between the loops, and end links provided with hooks adapted to be engaged with the links of side chains.

2. A chain comprising links having bar-like body portions with oppositely disposed round loops at their ends and spherical lugs fixed on said body portions between the loops.

3. A tire chain cross member comprising a plurality of links having bar-like body portions with oppositely disposed round co-engaging loops at their ends, and spherical lugs fixed on said body portions between said loops, the diameters of the said spherical lugs being approximately that of the said loops.

In witness whereof, I have hereunto set my hand in the presence of two witnesses.

CHAUNCEY W. HODGES.

Witnesses:
GRACE B. THOMPSON,
WESLEY MARSTON.